United States Patent
Batra et al.

(10) Patent No.: US 9,537,533 B2
(45) Date of Patent: Jan. 3, 2017

(54) PLC FCH UNITARY CIRCLE DIFFERENTIAL SYMBOL AND PREAMBLE ENCODING DETERMINATION

(71) Applicant: Texas Instruments Incorporated, Dallas, TX (US)

(72) Inventors: Anuj Batra, Dallas, TX (US); Tarkesh Pande, Dallas, TX (US); Il Han Kim, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/056,755

(22) Filed: Oct. 17, 2013

(65) Prior Publication Data

US 2014/0112397 A1   Apr. 24, 2014

Related U.S. Application Data

(60) Provisional application No. 61/715,675, filed on Oct. 18, 2012.

(51) Int. Cl.
*H04B 3/54* (2006.01)
*H04L 27/233* (2006.01)
*H04L 27/26* (2006.01)

(52) U.S. Cl.
CPC ............ *H04B 3/542* (2013.01); *H04L 27/2331* (2013.01); *H04L 27/2613* (2013.01)

(58) Field of Classification Search
CPC ................................. H04B 3/54; H04L 1/0059
USPC ........ 375/222, 257, 260, 295; 370/203, 208, 370/210
See application file for complete search history.

(56) References Cited

U.S. PATENT DOCUMENTS

| | | | | |
|---|---|---|---|---|
| 7,376,075 B1* | 5/2008 | Petranovich | ........ | H04L 27/3494 370/205 |
| 2007/0110108 A1* | 5/2007 | Kang | .................... | H04L 1/0041 370/515 |
| 2009/0041166 A1* | 2/2009 | Patel | ................. | H03M 13/3746 375/341 |
| 2010/0272210 A1* | 10/2010 | Kwon | ................... | H04L 27/183 375/295 |
| 2010/0316140 A1* | 12/2010 | Razazian et al. | ........ | H04B 3/54 375/257 |
| 2011/0043340 A1* | 2/2011 | Kim | ....................... | H04B 3/542 375/260 |
| 2012/0327987 A1* | 12/2012 | Dabak | ................... | H04B 3/542 375/222 |

OTHER PUBLICATIONS

Yonge, Larry, Jose Abad, Kaywan Afkhamie, Lorenzo Guerrieri, Srinivas Katar, Hidayat Lioe, Pascal Pagani, Raffaele Riva, Daniel M. S. "An Overview of the Homeplug AV2 Technology," Powerline Communications: Smart Grid, Transmission and Propagation. Journal of Electrical and Computer Engineering. Aug. 3, 2012, pp. 35-54 (pp. 1-20 for article).*

* cited by examiner

*Primary Examiner* — Daniel Washburn
*Assistant Examiner* — Eboni Hughes
(74) *Attorney, Agent, or Firm* — Lawrence J. Bassuk; Charles A. Brill; Frank D. Cimino

(57) ABSTRACT

Embodiments of the invention provide a method for discriminating between two types of encoding schemes for the frame control header (FCH) used in G3-type narrow band OFDM communications. The two modes for encoding are Differential with respect to the previous Symbol (DS) and Differential with respect to the Preamble (DP). This mode is sometimes referred to as "coherent" mode.

5 Claims, 3 Drawing Sheets

PLC FCH UNITARY CIRCLE DIFFERENTIAL SYMBOL AND PREAMBLE ENCODING DETERMINATION

CROSS-REFERENCE TO RELATED APPLICATION(S)

This application claims the benefit of the filing date of U.S. Provisional Patent Application No. 61/715,675, which is titled "Encoding Method for Frame Control Header (FCH)" and was filed on Oct. 18, 2012, the disclosure of which is hereby incorporated by reference herein in its entirety.

BACKGROUND

Embodiments of the invention are directed, in general, to Power Line Communication (PLC) systems and, more specifically, to encoding frame control header in PLC systems.

Various OFDM-based standards exist for narrowband power-line communications, such as the G3-GENA, G.hnem, IEEE-P1901.2 standards.

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics. PRIME is designed for low voltage lines with low noise and targets higher data rates. On the other hand, G3 is designed for medium voltage lines and targets lower data rates.

BRIEF DESCRIPTION OF THE DRAWINGS

Figure 1:
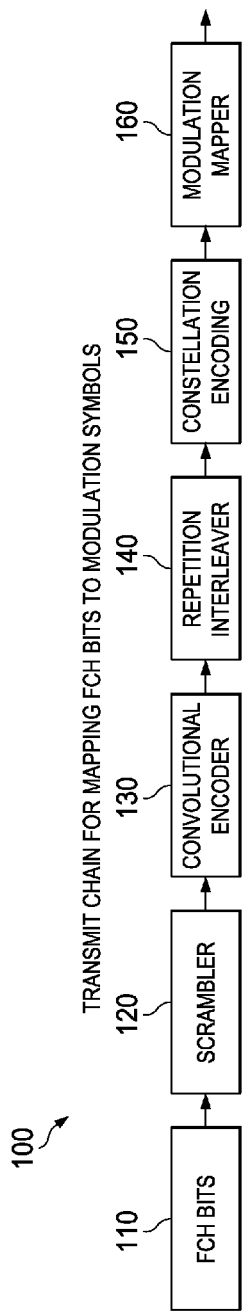

Having thus described the invention(s) in general terms, reference will now be made to the accompanying drawings, wherein:

FIG. 1 shows transmit chain for mapping FCH bits to modulation symbols.

Figure 2:
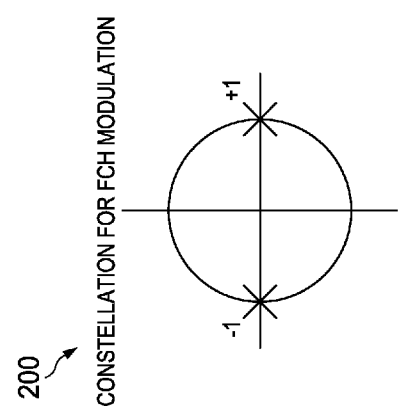

FIG. 2 shows constellation for FCH modulation

Figure 3:
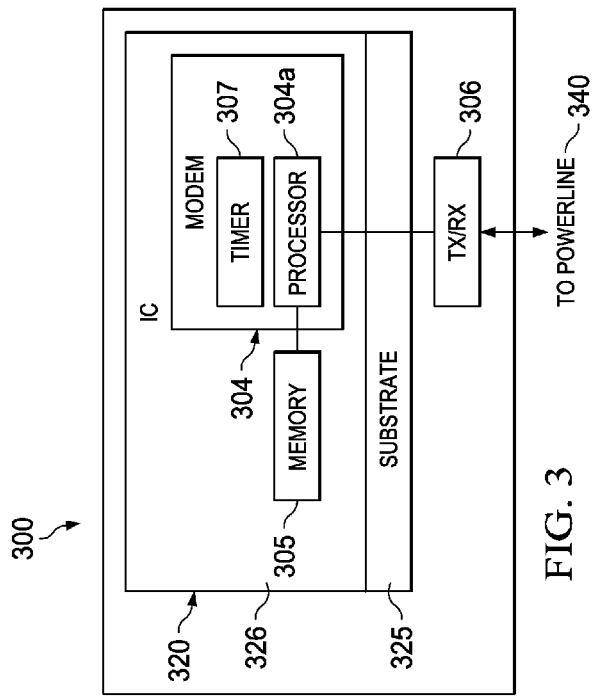

FIG. 3 is a block diagram schematic of a communication device having a disclosed modem with processor that implements FCH detector, according to an example embodiment.

Figure 4:
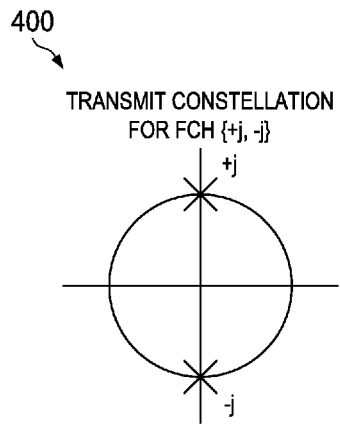

FIG. 4 shows transmit constellation for FCH {+j, −j}

Figure 5:
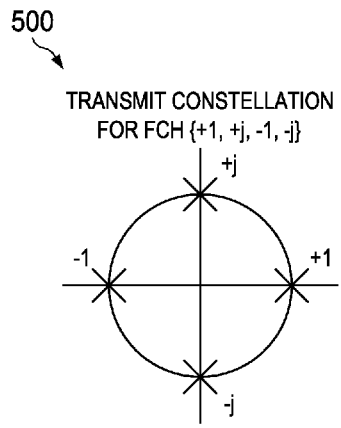

FIG. 5 shows transmit constellation for FCH {+1,+j, −1, −j}

Figure 6:
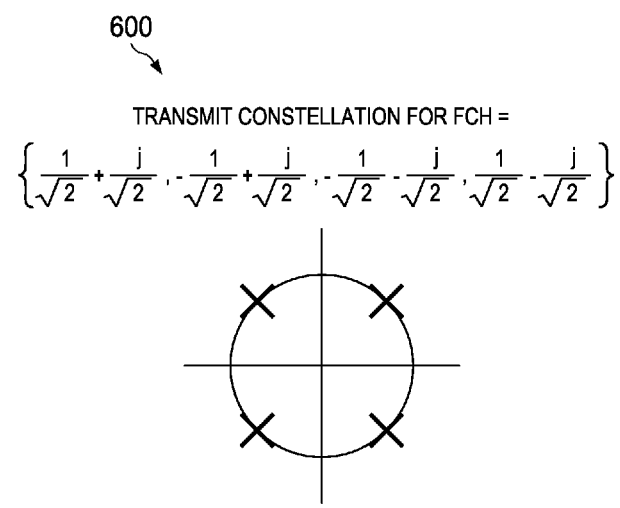

FIG. 6 shows transmit constellation for FCH $$\left\{\frac{1}{\sqrt{2}} + \frac{j}{\sqrt{2}}, -\frac{1}{\sqrt{2}} + \frac{j}{\sqrt{2}}, -\frac{1}{\sqrt{2}} - \frac{j}{\sqrt{2}}, \frac{1}{\sqrt{2}} - \frac{j}{\sqrt{2}}\right\}$$

Figure 7:
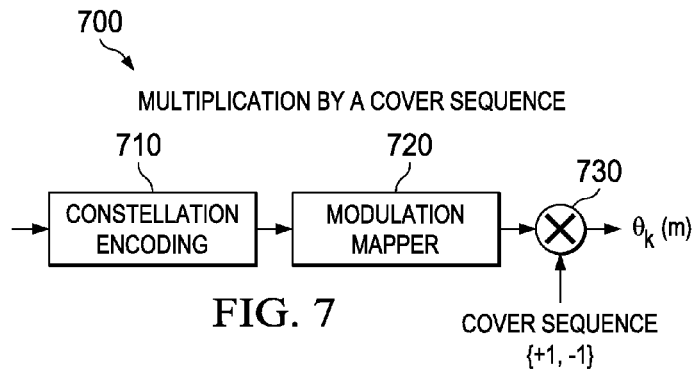

FIG. 7 shows multiplication by a cover sequence

Figure 8:
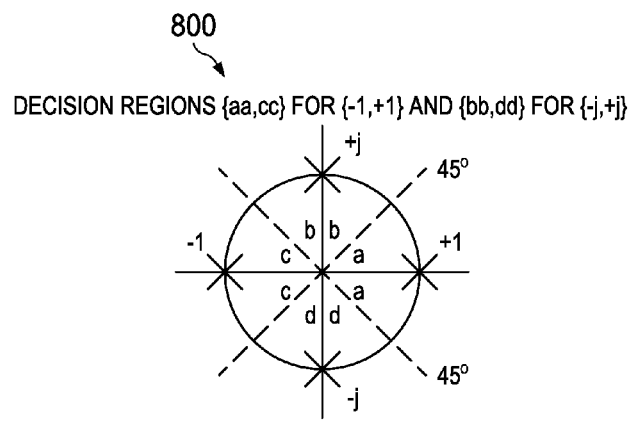

FIG. 8 shows decision Regions {aa,cc} for {−1,+1} and {bb,dd} for {−j, +j}

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Described are methods for discriminating between two types of encoding schemes for the frame control header (FCH) used in G3-type and P1901.2 narrow band OFDM communications OFDM communications. The two modes for encoding are:
1. DS: Differential with respect to the previous Symbol
2. DP: Differential with respect to the Preamble. This mode is sometimes referred to as "coherent" mode Table 1 summarizes the different possibilities for FCH encoding format.

| Band Plan | CENELEC | FCC/ARIB Differential | Optional Coherent |
|---|---|---|---|
| IEEE P1901.2 | DP | DP | DP |
| ITU-T G9903 | DS | DS | DP |

IEEE P1901.2 encodes the FCH symbols with respect to the preamble (DP or "coherent" mode). ITU-T G9903 may encode it either differentially with respect to the previous symbol (DS) or encode it with respect to the preamble (DP).

IEEE P1901.2 encodes the FCH (G3) symbols with respect to the preamble (DP or "coherent" mode). ITU-T G9903 may encode it either differentially with respect to the previous symbol (DS) or encode it with respect to the preamble (DP). FIG. 1 is a high level block diagram of a signal processing block structure 100 transmit chain for transmitting frames including a disclosed extended PHY header in a PLC network in accordance with an embodiment of the invention such as for circuits complying with the IEEE P1901.2 standards. Transmitter 100 is illustrative of FCH bits 110 being scrambled in scrambler 120. The scrambled bits are encoded in convolution encoder 130. Then they are interleaved in a repetition interleaver 140. The result is encoded in to a constellation 150. The FCH bits are then mapped to the modulation symbols in a modulation mapper 160.

An OFDM signal is generated and provided to a power line circuit, such as a medium voltage (MV) or low voltage (LV) power line. This is done thorough analog front end (AFE) and coupling circuitry. The coupling circuitry may include, for example, line drivers, transformers, filters, and MV/LV couplers.

Two types of encoding schemes are used in mapper 160. DS is differential with respect to the previous symbol and DP is differential with respect to the preamble. This mode is sometimes referred to as "coherent" mode.

$$DP \text{ Encoding: } \theta_k(m) = \overline{\psi}_k + \phi_k(m) \quad (1)$$

$$DS \text{ Encoding: } \theta_k(m) = \overline{\psi}_k + \sum_{n=1}^{m} \phi_k(n) \quad (2)$$

where $\overline{\psi}_k$: denotes the preamble phase for the $k^{th}$ subcarrier
$\phi_k(m)$: denotes the phase of the symbol at the output of the constellation encoding block corresponding to the $k^{th}$ subcarrier in the $m^{th}$ FCH OFDM symbol
$\theta_k(m)$: denotes the phase of the symbol that is mapped to the $k^{th}$ subcarrier in the $m^{th}$ FCH OFDM symbol.

In both cases, the constellation encoding for the FCH is chosen from the transmit constellation set {+1,−1} 200 as shown in FIG. 2 i.e., $\phi$ is chosen from the set {0,π}.

The constellation encoding rule and modulation mapping rule may also be described as in Tables 1a and 1b below TABLE 1b

| Modulation Mapping Rule | |
| --- | --- |
| Input Symbol | Output Phase |
| 1 | $\psi_k$ |
| −1 | $\psi_k + \pi$ |

TABLE 1a

| Constellation Encoding Rule | |
| --- | --- |
| input bit from Interleaver | Output symbol |
| 0 | 1 |
| 1 | −1 |

In Table 1b, for DP encoding, $\psi_k$ has the same definition as $\overline{\psi}_k$ in equation (1) while for DS encoding:
$1^{st}$ FCH symbol (m=1): $\psi_k = \overline{\psi}_k$
Subsequent FCH symbols (m>1):

$$\psi_k = \theta_k(m-1) = \overline{\psi}_k + \sum_{n=1}^{m-1} \phi_k(n)$$

A key point to note is that since $\phi \in \{0,\pi\}$ this implies $$\sum_{n=1}^{m} \phi_k(n) \in \{0, \pi\}.$$

Therefore, if a receiver does not know a prioiri that the FCH is DS or DP encoded, it cannot determine which method was used until it has decoded the full FCH frame and checked to see whether the frame check sequence (CRC) passed. As the FCH consists of multiple OFDM symbols (13 symbols in the CENELEC-A band and 12 symbols in the FCC band), this results in increased processing and memory requirements.

FIG. 3 is a block diagram schematic of a communication device 300 having a disclosed modem 304 that implements FCH detection algorithm, according to an example embodiment. Communications device 300 may be used at a service node (which includes switch nodes and terminal nodes) or a base (data concentrator) node in the PLC communications network.

Modem 304 includes a processor (e.g., a digital signal processor, (DSP)) 304a coupled to an associated memory 305 that that stores a disclosed FCH detector algorithm which provides code for the FCH detector algorithm.

Memory 305 comprises non-transitory machine readable storage, for example, static random-access memory (SRAM). In operation, the processor 304a is programmed to implement the FCH detector algorithm. Modem 304 includes a timer 307, such as for ACK transmission, Carrier Sense Multiple Access/collision avoidance (CSMA)/CA) back-off and data transmission purposes.

The PLC transceiver (TX/RX) 306 is communicably coupled to the modem 304 for coupling of the communications device 300 to the shared powerline 340. Transceiver 306 facilitates communications with other SNs and the BN on the powerline 340.

The modem 304 is shown formed on an integrated circuit (IC) 320 comprising a substrate 325 having a semiconductor surface 326, such as a silicon surface. Memory 305 may be included on the IC 320. In another embodiment the modem 304 is implemented using 2 processor chips, such as 2 DSP chips. Besides the DSP noted above, the processor 304a can comprise a desktop computer, laptop computer, cellular phone, smart phone, or an application specific integrated circuit (ASIC).

Disclosed modems 304 and disclosed communications devices 300 may be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

In order to allow for the receiver to discriminate between DP and DS type FCH encoding without having to decode the whole FCH frame, a modified constellation is used with DP, which allows for simple detection mechanisms to be used at the receiver (rx).

The following embodiments describe different ways in which the modulation set is modified for the FCH when doing DP encoding (differential with respect to the preamble). The key idea is that the constellation set is modified to include complex symbols that lie on the unitary circle thus allowing the symbol phases $\phi_k(m)$ to be more than just 0 and π.

Embodiment 1

If FCH is encoded using DP, the modulation constellation on each of the subcarriers for the FCH is chosen from the transmit constellation set {+j, −j} 400 as shown in FIG. 4.

Some examples of mapping rules that generate the above constellation are shown below:

TABLE 2a

Example mapping rule

| Input Bit | Current Symbol Phase |
|---|---|
| 0 | j (pi/2) |
| 1 | −j (3pi/2) |

TABLE 2b

Example mapping rule

| Input Bit | Current Symbol Phase |
|---|---|
| 0 | −j (3pi/2) |
| 1 | j (pi/2) |

TABLE 3

Example constellation encoding and modulation mapping rules

Constellation Encoding Rule

| input bit from Interleaver | Output symbol |
|---|---|
| 0 | j |
| 1 | −j |

Modulation Mapping Rule

| Input Symbol | Output Phase |
|---|---|
| j | $\psi_k + \dfrac{\pi}{2}$ |
| −j | $\psi_k + \dfrac{3\pi}{2}$ |

TABLE 4

Constellation Encoding Rule

| input bit from Interleaver | Output symbol |
|---|---|
| 0 | −j |
| 1 | j |

Modulation Mapping Rule

| Input Symbol | Output Phase |
|---|---|
| j | $\psi_k + \dfrac{\pi}{2}$ |
| −j | $\psi_k + \dfrac{3\pi}{2}$ |

Embodiment 2

If FCH is encoded using DP, the modulation on each of the subcarriers for the FCH is chosen from the transmit constellation set {+1,+j, −1, −j} 500 as shown in FIG. 5.

Note that the above constellation may be generated by using the mapping rule as shown in table 5 below

TABLE 5

Example mapping rule from bits to phase

| Input Bit | Current Symbol Phase |
|---|---|
| 0 | pi/2 + previous symbol phase |
| 1 | 3*pi/2 + previous symbol phase |

One example of constellation encoding rules that generate the above constellation is given in Table 6 below together with the corresponding modulation mapping rule

TABLE 6

Example mapping rule from bits to phase

Constellation Encoding Rule

| input bit from Interleaver | Output symbol |
|---|---|
| 0 | j * (previous output symbol) |
| 1 | −j * (previous output symbol) |

Modulation Mapping Rule

| Input Symbol | Output Phase |
|---|---|
| j * (previous output symbol) | $\psi_k + \dfrac{\pi}{2} + \phi_k(m-1)$ |
| −j * (previous output symbol) | $\psi_k + \dfrac{3\pi}{2} + \phi_k(m-1)$ |

Embodiment 3

If DP encoding is done on the FCH, the modulation on each of the subcarriers for the FCH is chosen from the transmit constellation set $$\left\{ \frac{1}{\sqrt{2}} + \frac{j}{\sqrt{2}}, -\frac{1}{\sqrt{2}} + \frac{j}{\sqrt{2}}, -\frac{1}{\sqrt{2}} - \frac{j}{\sqrt{2}}, \frac{1}{\sqrt{2}} - \frac{j}{\sqrt{2}} \right\}$$

600 as shown in FIG. 6.

One example of constellation encoding rules that generate the above constellation is given in Table 7 below together with the corresponding modulation mapping rule

TABLE 7

Example mapping rule from bits to phase

Constellation Encoding Rule

| input bit from Interleaver | Output symbol |
|---|---|
| 0 | $\dfrac{1}{\sqrt{2}} + \dfrac{j}{\sqrt{2}} *$ (previous output symbol) |
| 1 | $-\dfrac{1}{\sqrt{2}} - \dfrac{j}{\sqrt{2}} *$ (previous output symbol) |

TABLE 7-continued

Example mapping rule from bits to phase

| Modulation Mapping Rule | |
|---|---|
| Input Symbol | Output Phase |
| $\frac{1}{\sqrt{2}} + \frac{j}{\sqrt{2}} *$ (previous output symbol) | $\psi_k + \frac{\pi}{4} + \phi_k(m-1)$ |
| $-\frac{1}{\sqrt{2}} - \frac{j}{\sqrt{2}} *$ (previous output symbol) | $\psi_k - \frac{3\pi}{4} + \phi_k(m-1)$ |

Embodiment 4

In some embodiments, the output of the modulation mapper 160 may be further multiplied by a cover sequence 710 as shown in FIG. 7. The cover sequence is known at the receiver. Some examples of cover sequences are 1. An all 1 sequence
2. An all −1 sequence
3. A sequence of alternating +1's and −1's
4. A pseudo random +/−1 sequence generated by a pseudo-random generator whose initial seed is known at the receiver
5. A sequence stored in memory which is repeated to produce a sequence equal to the length of the input sequence.

Note that the effect of the cover sequence 710 is to introduce a phase change of 0 or pi on $\theta_k(m)$. The phase change may be independent from subcarrier to subcarrier; be the same for a subset of subcarriers, or be the same for all the subcarriers in a given OFDM symbol.

FCH Mode Detection at Receiver

A receiver such as communication device shown in FIG. 3 may intelligently detect whether the FCH follows DP or DS encoding by determining where the majority of the demodulated symbols lie. As an example, if Embodiment 1 is used for DP encoding at the transmitter then the demodulated symbols at the receiver will lie in regions bb and dd. Alternatively, if DS encoding is done at the transmitter then the demodulated symbols at the receiver will lie in regions aa and cc.

Hence, one embodiment for an FCH mode detector at the receiver is to count the number of demodulated symbols in regions bb and dd and compare this to the number of demodulated symbols in region cc and aa. If the count in bb and dd is more than the count in cc and aa, the FCH is declared to be DP encoded.

As noted in the introduction, if DS encoding is over the {−1, +1} constellation then $$\sum_{n=1}^{m} \phi_k(n) \in \{0, \pi\}.$$

On the other hand if we modify the DP encoding to be over the {−j, +j} constellation, then $\phi_k(m) \in \{-\pi/2, \pi/2\}$ (unless stated otherwise throughout the remaining of this section we will assume that DP encoding is done with {−j, +j} constellation in order to illustrate the Encoding-Detection (ED) methodology). This allows a receiver to intelligently detect whether the FCH follows DP or DS encoding by determining where the majority of the demodulated symbols lie. FIG. 8, illustrates the decision regions for deciding between the constellation set {+1, −1}, and {+j, −j}. The dashed lines are at 45 degrees with the X-Y coordinated frame.

Let $$y_k(m) = h_k(m) e^{j\theta_k(m)} + n_k(m)$$

$$P_k = h_k e^{j\psi_k} + n_k \quad (3)$$

where $y_k(m)$ is the received signal in the $m^{th}$ FCH symbol and $k^{th}$ subcarrier, $P_k$ is the received syncP preamble symbol in the $k^{th}$ subcarrier, $h_k(m)$ denote the channel gain, $e^{j\theta_k(m)}$ denote the transmitted symbol and $n_k(m)$ denote the noise.

If the detector at the receiver is a DP detector unless, the following intermediate metric is first constructed in order to remove the phase rotation due to preamble $$y_k^1(m) = (P_k)^* y_k(m) \quad (4)$$

In case the detector at the receiver is a DS detector, the intermediate metric is $$y_k^1(m) = (P_k)^* y_k(m) \text{ for } m=1$$

$$y_k^1(m) = (y_k(m-1))^* y_k(m) \text{ for } m>1 \quad (5)$$

Then based on FIG. 8, it is easy to see that following decision rule can be used to discriminate between constellation set {0,π} and constellation set {−π/2,π/2}

$$|Re(y_k^1(m))| > |Im(y_k^1(m))| \rightarrow \{-1, 1\}$$

$$Re(y_k^1(m))| < |Im(y_k^1(m))| \rightarrow \{-j, j\} \quad (6)$$

where Re implies the real operation, Im implies the imaginary operation and |.| implies taking the absolute value. The above decision rule can be generalized by first defining the metric:

$$\zeta_k(m) = \alpha_1 |Re(y_k^1(m))|^{\alpha_2} - \beta_1 |Im(y_k^1(m))|^{\beta_2})^\lambda \quad (7)$$

where $(\alpha_1, \beta_1, \alpha_2, \beta_2, \lambda)$ are constants. Then the decision rule is given by $$\zeta_k(m) > 0 \rightarrow \{-1, 1\}$$

$$\zeta_k(m) < 0 \rightarrow \{-j, j\} \quad (8)$$

Note that (8) is a special case of (6) with ($\alpha_1=1$, $\beta_1=1$, $\alpha_2=1$, $\beta_2=1$, $\lambda=1$). Table 8 is illustrative of the expected constellation output in the ideal (no noise, ideal channel) scenario for the different combinations of receiver detectors and transmitted FCH format.

TABLE 8

Expected Constellation output for the different Rx metrics.

| | Transmit FCH with DP Encoding assuming Tx Constellation {−j, j} | Transmit FCH with DS Encoding assuming Tx constellation {−1, 1} |
|---|---|---|
| Rx metric $\zeta_k$ (m) with $y_k^1$ (m) based on (4) | {−j, j} for all m | {−1, 1} for all m |
| Rx metric $\zeta_k$ (m) with $y_k^1$ (m) based on (5) | {−j, j} for m = 1<br>{−1, 1} for m > 1 | {−1, 1} for all m |

From Table 8 it is clear that if the Rx metric is based on (4), then subcarrier outputs from all the FCH symbols may be used to make a decision. Whereas if the Rx metric is based on (5) then subcarrier outputs from only the first FCH symbol may be used to make a decision.

Variations of Metric and Decoding Rules:

It is assume in this section unless otherwise stated that the intermediate metric $y_k^1(m)$ is based on Equation (4).

In some embodiments analogous to hard decision decoding, the decision metric $\zeta_k(m)$ for each subcarrier may first be quantized to a +1 or −1 value $$\zeta_k(m) > 0 \rightarrow \tilde{\zeta}_k(m) = 1$$

$$\zeta_k(m) < 0 \rightarrow \tilde{\zeta}_k(m) = -1 \quad (9)$$

followed by averaging across subcarriers and symbols i.e, $$\tilde{\zeta} = \sum_{k=1}^{numSubcarriers} \sum_{m=1}^{numSymbols} \tilde{\zeta}_k(m) \quad (10)$$

and then running the decision rule $$\tilde{\zeta} > 0 \rightarrow \{-1, 1\}$$

$$\tilde{\zeta} < 0 \rightarrow \{-j, j\} \quad (11)$$

The number of symbols to average over may be predefined or it may be adaptive. An example of an adaptive system is whereby once $|\tilde{\zeta}|>$metricThreshold, then the decision is forced. The number of subcarriers to average over may be predefined or the averaging may only be done over a group of subcarriers with an SNR exceeding an SNR threshold value. The SNR can be computed based on the preamble.

In some embodiments analogous to soft decision decoding, no quantization may be done on the subcarrier metric $\zeta_k(m)$ before averaging i.e., the decision metric is constructed as follows $$\zeta = \sum_{k=1}^{numSubcarriers} \sum_{m=1}^{numSymbols} \zeta_k(m) \quad (12)$$

and then running the decision rule given in (11).

In yet another embodiment, $\zeta_k(m)$ may be weighted based on the symbol number or subcarrier number. As an example in cases where there is high residual frequency offset, the reliability of metric $\zeta_k(m)$ may decrease with increasing symbol number. Hence the following decision metric can be constructed $$\zeta = \sum_{k=1}^{numSubcarriers} \sum_{m=1}^{numSymbols} f(k,m) \times \zeta_k(m) \quad (13)$$

where $f(k,m)$ is a weighting function that depends on subcarrier number and symbol number. The weighting function may also take into account the unreliability of tones where intereferers are detected (i.e., the information in these tones is less and the weighting function thus assigns less weight)

From equations (3)-(6), it is clear that the phase estimate of the preamble will also affect the performance. In order to reduce the impact of noise, the preamble estimates can also be smoothed or averaged over time. Smoothing can also be done over frequency.

In some embodiments, the subcarrier metric can also be re-defined to be $$\zeta_k(m) = f\left(\frac{|Re(y_k^1(m))|}{|Im(y_k^1(m))|}\right) \quad (14)$$

where f is any monotonically increasing or decreasng function e.g., arctangent, log etc. . . .

The decision rule in this case is then given by $$\zeta_k(m) > \alpha \rightarrow \{-1, 1\}$$

$$\zeta_k(m) < \alpha \rightarrow \{-j, j\}$$

where $\alpha$ is a constant.

All combinations the previously discussed ideas are also valid i.e.,

1. Different metrics
2. Hard or soft decisions
3. Averaging over tones
4. Averaging over symbols
5. Weighting tones to emphasize some tones over other tones Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

The invention claimed is:

1. A method comprising:
    receiving packets in a power line communication receiver, the packets including frame control header symbols and data symbols, the frame control header symbols being encoded in one of first and second encoding modes;
    demodulating less than all of the encoded frame control header symbols in the receiver;
    applying the demodulated frame control header symbols to a unitary circle in the receiver;
    determining in the receiver where a majority of the demodulated frame control header symbols lie on the unitary circle to determine whether the frame control header is encoded with the first encoding mode or the second encoding mode, the determining including:
        counting a first number of demodulated frame control header symbols in a first region of the unitary circle and counting a second number of demodulated frame control header symbols in a second region of the unitary circle different from the first region;
        comparing the first number of demodulated frame control header symbols in the first region of the unitary circle with the second number of demodulated frame control header symbols in the second region of the unitary circle; and
        determining the frame control header to be one of the encoding modes if the first number is more than the second number; and
    decoding in the receiver the remaining demodulated frame control header symbols according to the determined encoding mode.

2. The method of claim 1 in which the receiving includes receiving a frame control header of one of 12 and 13 OFDM symbols.

3. The method of claim 1 in which the unitary circle has four quadrants, the first region includes:
- contiguous parts of the first quadrant and fourth quadrant, and contiguous parts of the second quadrant and third quadrant; and
- the second region includes the remaining parts of the quadrants.

4. The method of claim 1 in which the first encoding mode is differential with respect to a preamble and the second encoding mode is differential with respect to a previous symbol.

5. The method of claim 1 in which the determining the frame control header to be one of the encoding modes includes determining the encoding mode to be differential with respect to a preamble.

* * * * *